United States Patent [19]

Rouzier

[11] 4,035,435

[45] July 12, 1977

[54] ADHERENCE OF TEXTILE FIBERS TO UNSATURATED POLYMERS

[75] Inventor: Georges Rouzier, Clermont-Ferrand, France

[73] Assignee: Compagnie Generale des Etablissements Michelin, raison sociale Michelin & Cie, France

[21] Appl. No.: 722,711

[22] Filed: Sept. 13, 1976

Related U.S. Application Data

[60] Division of Ser. No. 576,130, May 9, 1975, which is a continuation of Ser. No. 397,608, Sept. 14, 1973, abandoned, which is a division of Ser. No. 241,815, April 6, 1972, Pat. No. 3,817,890, which is a continuation-in-part of Ser. No. 802,268, Feb. 25, 1969, abandoned.

[30] Foreign Application Priority Data

Feb. 26, 1968 France .......................... 68.141324

[51] Int. Cl.² .................... C08G 8/04; C08L 61/06
[52] U.S. Cl. ................................ 260/838; 260/54; 260/57 R

[58] Field of Search ....................... 260/838, 57, 54

[56] References Cited

U.S. PATENT DOCUMENTS

| | | | |
|---|---|---|---|
| 1,889,751 | 12/1932 | Kessler | 260/54 |
| 2,878,198 | 3/1959 | Irgram et al. | 260/54 |
| 3,111,448 | 11/1963 | Tawney | 260/54 |
| 3,389,125 | 6/1968 | Dietrick et al. | 260/54 |
| 3,475,355 | 10/1969 | Decker | 260/54 |
| 3,525,379 | 8/1970 | Johnson et al. | 260/54 |
| 3,634,276 | 1/1972 | Kreibich et al. | 260/54 |

*Primary Examiner*—V. P. Hoke
*Attorney, Agent, or Firm*—Brumbaugh, Graves, Donohue & Raymond

[57] ABSTRACT

The adhesion of textile fibers to unsaturated polymers is made possible by use of an adhesive which comprises a blend of one or several elastomer latices and a phenoplast system based on a precondensate of formaldehyde, resorcinol and a para-substituted phenol having one or two active methylene groups and a precondensate of formaldehyde and resorcinol.

1 Claim, No Drawings

ADHERENCE OF TEXTILE FIBERS TO UNSATURATED POLYMERS

This application is a divisional application of my U.S. application Ser. No. 576,130, filed May 9, 1975; which application is a continuation application of my U.S. application Ser. No. 397,608, filed Sept. 14, 1973, now abandoned; which application is a divisional application of my U.S. application Ser. No. 241,815, filed Apr. 6, 1972, now U.S. Pat. No. 3,817,890; which is a continuation-in-part application of my U.S. application Ser. No. 802,268, filed Feb. 25, 1969, now abandoned.

The present invention relates to rendering textile fibers, especially fibers in the form of wires or cords consisting of artificial or synthetic materials such as rayon, polyamides — in particular aromatic polyamides — and polyesters, adherent to unsaturated polymers and especially unsaturated elastomers, for example, natural rubber and polymers or copolymers of a conjugated diene. It concerns more specifically the gluing or sizing of polyamide, and above all polyester, cord materials destined for use in the manufacture of reinforcement plies rubber articles, for example, tires. As new industrial products, it comprises adhesives suitable for the bonding of textile fibers to unsaturated polymers as well as new intermediate compounds used in the preparation of these adhesives. It also comprises a method for preparing the said adhesives and intermediate compounds. Finally, it covers a method of application of these adhesives.

Although the bonding of rayon fibers to elastomers has been achieved by means of resorcinol-formaldehyde resins, the problem of rendering certain kinds of fibers, especially polyester fibers, adherent to the customary elastomers has not yet been solved to the satisfaction of industry. The various solutions proposed until now all have deficiencies which limit their application. In order to be industrially acceptable, a solution of this problem should satisfy the following conditions which are far from being fulfilled by the known solutions.

Firstly, the adhesion obtained should be both of a high degree and uniform, without enclosure of the fiber in a rigid film which robs it of part of its elasticity. If possible, the force bringing about the tearing off of the fiber should be equal to or higher than the force causing the tearing of the elastomer.

Secondly, the gluing or sizing should permit the use of existing materials employed in tire manufacturing shops to treat rayon, and it should not require specifically any heat treatment at very high temperatures, for example of 240° C. or higher, since such temperature are difficult to obtain with steam under pressure which is the generally available heat source in the tire industry.

Thirdly, the adherence treatment should be attained economically and consequently it should comprise a treatment of the fibers requiring only a minimum of operations, and especially one single impregnating bath, and the use of a minimum of products which are not in current use and/or expensive, such as vinylpyridine copolymer latex, epoxide or isocyanate derivatives, etc.

The present invention provides a solution which fulfills these various conditions in that it provides economical and industrially acceptable sizings having an adhesive strength between synthetic polyester or polyamide fibers and the customary elastomers equal to or exceeding the breaking strength of the elastomer.

The present invention rests on the discovery that under certian conditions it was possible to obtain extraordinary adhesion by means of a phenoplastic system dispersible in water in the presence of latex of the customary elastomers, such system being obtained by grafting certain phenoplasts on a resorcinol-formaldehyde phenoplastic resin. The phenoplasts to be grafted on are selected in such a manner as to assure good connection with the fiber in the course of treatment and good structuring of the film deposited on the fiber during vulcanization of the elastomer while the base or support resin brings about progressive crosslinking of the phenoplastic system in the course of the thermal treatment and finally assures a solid bond with the elastomer.

More precisely speaking, the method in accordance with the invention for the preparation of adhesives for the bonding of unsaturated polymers to artificial or synthetic fibers, wires or cords, specifically those consisting of aromatic polyamides or polyesters, comprises the following:

a. In a first stage, causing the condensation with resorcinol, preferably in a hydrocarbon medium and in the presence of a catalyst which is acid but with elimination of water — or of hydride — as it is formed, of one or more phenols or phenol derivatives substituted preferably in the para position and having in the ortho and ortho' positions two active methylene groups, for example methylol groups, or also a condensate soluble or dispersible in a hydrocarbon medium of such phenols or phenol derivatives, whereby there is by preference an excess of resorcinol in relation to the active methylene groups, with the condensation thus achieved facilitating the obtention of a homogeneous solution of compounds comprising two condensed, terminal resorcyl rings on one or more para-substituted orthomethylene phenol rings;

b. In a second stage, causing the condensation with formaldehyde, in an alkaline, aqueous and preferably diluted alcohol medium, of the compounds obtained during the first stage, whereby the formaldehyde proportion ranges from one to two mols per mol of resorcinol used in the preparation of the said compounds. The condensation thus undertaken facilitates the obtention of a precondensate with terminal resorcyl-methylol groups, which is soluble or dispersible in water, melts easily at relatively low temperatures and is reactive to heating;

c. In a third stage, dissolving in water or dispersing in an aqueous emulsion the aforementioned precondensate, doing so in the presence of another resorcinol and formaldehyde precondensate preferably prepared in the presence of alcohol from one-half to one mol of formaldehyde per mol of resorcinol as well as in the presence of one or more unsaturated polymer latexes.

In accordance with a preferred variant, during the first stage, one causes condensation of the resorcinol with the para-substituted bis-orthomethylene phenol or phenol derivative simultaneously with condensation of the resorcinol with a para-substituted monomethylene phenol or phenol derivative, the single methylene group of which is located in the ortho or in the para position and by preference in the ortho position. In this case, the condensation facilitates the obtention of a homogeneous solution containing, in addition to the compounds comprising two condensed terminal resorcyl rings on one or several para-substituted orthomethylene phenol rings, compounds comprising one condensed terminal resorcyl ring on one or more para or ortho-substituted phenol rings.

Furthermore, it is possible and in conformity with the invention to substitute totally and not only partially, a monomethylene phenol or phenol derivative for the para-substituted bis-orthomethylene phenol or phenol derivative referred to above.

In accordance with another variant, it is possible to combine into a single stage the second and third stages specified above. This is done by introducing into an alkaline diluted-alcohol medium the precondensate obtained during the first stage, with the total quantities of resorcinol and formaldehyde used in the second and third stages as indicated above, whereby the resinous systems obtained are subsequently dissolved or dispersed in an aqueous medium in the presence of latices.

The various substituted mono or dimethylene phenols or phenol derivatives that may be employed comprise:

1. Phenols with the general formula

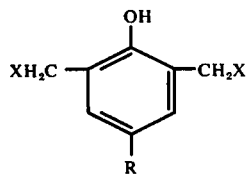

I or their mixtures. In this formula, R is an aryl or alkyl radical, preferably with at least 4 but not more than 18 carbon atoms, or one halogen atom; X is —OH, a halogen, an alkoxy or aryloxy group,

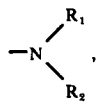

($R_1$ and $R_2$ being alkyl and/or aryl), a benzothiazol thio ether, or some other group facilitating with the phenols a nuclear "C" condensation under catalytic or thermal action.

2. Phenols with the general formula

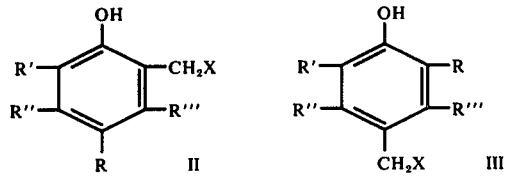

II    III or their mixtures. In these formulas X has the same definition as above; R, R', R'', R''' can be hydrogen, a halogen or an alkyl radical, R'' and R''' generally being hydrogen.

3. The para-substituted polyphenol compounds complying with the general formula

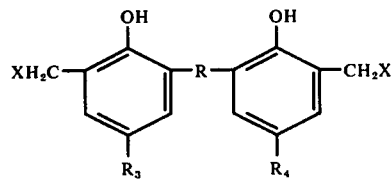

IV or their mixtures. In this formula, X has the same definition as above; $R_3$ and $R_4$ are aryl or alkyl radicals or halogen atoms, R is oxygen, sulfur, an alkylene, alkyleneoxy, arylene, aryleneoxy, cycloalkylene or cycloalkyleneoxy radical.

4. The para-substituted polyphenol compounds complying with the general formula

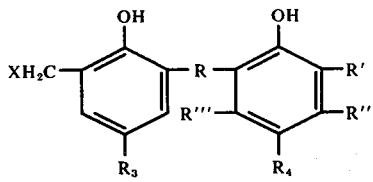

V or their mixtures. In this formula, X has the same definition as above; $R_3$, $R_4$ and R have the same definition as in 3 above; R', R'', and R''' have the same definition as in 2 above.

5. Any condensate of oligomer of the above phenols or phenol derivatives, preferably with a low molecular weight and not comprising more than 4 phenol groups, obtained, for example, in a well-known manner, namely, condensation in an alkaline medium with formaldehyde. Such oligomers have been described, for example by Carlswell in "Phenoplasts" published by Interscience Publishers, N.Y., 1950. Such polycyclic phenols and condensates are on the market under various names, as will be indicated further on. In general, the condensates are easier to obtain than the corresponding monocyclic phenols.

As stated, one may either use para-substituted di-ortho-methylene phenols or phenol derivatives or one may add to them a certain proportion of para-substituted mono-methylene phenols or phenol derivatives which will have the effect of lowering the average molecular weight of the precondensate and of improving the characteristics of solubility and melting. Generally speaking, the preferred share is less than 50%. It is advantageous to take a phenol of the type I with a substituent in para position comprising at least 4 carbon atoms as well as a phenol of the type II with a substituent in para position consisting of a halogen atom of a methyl radical and some other substituent comprising more carbon atoms, or a phenol of the Type III with substituents in ortho and ortho' position consisting of a methyl radical or a halogen.

As examples of phenols which are para-substituted and have one or two active methylene groups, the following compounds may be mentioned, without limitation:

2,6-dimethylol-4-tertiary-butylphenol
2,6-dimethylol-4-amylphenol
2,6-dimethylol-4-octylphenol
2,6-dimethylol-4-nonylphenol
2,6-dimethylol-4-benzylphenol
2,6-dimethylol-4-(2,2-dimethylbenzyl) phenol
2,6-dimethylol-4-dodecylphenol
2,6-dimethylol-4-cyclohexylphenol
2,6-bis-chloromethyl-4-tertiary-butylphenol
2,6-bis-dimethylaminomethyl-4-tertiary-butylphenol
2,6-bis-methoxymethyl-4-tertiary-butylphenol
2,6-bis-isopropoxymethyl-4-tertiary-butylphenol
2,6-bis-phenoxymethyl-4-tertiary-butylphenol
2,6-bis-benzothiazol thiomethyl-4-octylphenol
2,6-bis-methyl thiomethyl-4-amylphenol 2-methylol-4,6-ditertiary-butylphenol
2-methylol-4-methyl-6-tertiary-butylphenol
2-methylol-4-tertiary-butyl-6-methylphenol
2-methylol-4,6-dioctylphenol
2-methylol-4,6-dichlorophenol
2-methylol-4-choloro-6-tertiary-butylphenol
2-methylol-3,5-dimethyl-4,6-dichlorophenol
4-methylol-2,6-ditertiary-butylphenol
4-methylol-2-methyl-6-tertiary-butylphenol
4-methylol-2,6-dichlorophenol
4-methylol-2-chloro-6-methylphenol
methylene-bis-(ortho-hydroxymethyl para-chlorophenol)
oxy-bis-(ortho-hydroxymethyl para-octylphenol)
thio-bis-(orthohydroxymethyl para-octylphenol)
hexamethylene-bis-(ortho-hydroxymethyl para-chlorophenol)
2,2'-dihydroxy-3,5-dimethyl-3'-hydroxymethyl-5'-chlorodiphenyl-methane
2,2'dihydroxy-3,5,5'trichloro-4,6-dimethyl-3'-hydroxymethyl-diphenyl-methane As examples of commercial phenol condensates which may be used, there may be mentioned those of:

O,O'-dimethylol p-alkyl phenols

With tertiary-butyl radical as the alkyl substituent in para position:
Superbeckacite 1001, of Reichhold Chemicals Inc.
SP 126, SP 134, SP 144 resins of the Schenectady Chemicals Inc.

With octyl radical as the alkyl substituent in para position:
SP 1045 and 1059 resins of Schenectady Chemicals Inc.
Amberol ST 137 resin of Rohm & Haas Company.

O,O'-dibromo-methylene p-octyl phenols

SP 1055 and SP 1056 resins of Schenectady Chemicals Inc.
One may also mention: the Durez 22.193 commercial products of Hooker Chemicals Corp., Catalin 9273 and 9750 of Catalin Corporation, Ionox 100 (4-methylol-2,6-ditertiary-butylphenol) and Ionox 201 (3,5-ditertiary-butyl-4-hydroxybenzyl ether) of Shell Oil Co.; Ethyl 703 (2,6-ditertiary-butyl-4-dimethylaminomethyl phenol) of the Ethyl Corporation.

The above enumerations are not limitative and furnish only some examples of known compounds that can be used.

The condensation of the first stage can be carried out on a large scale without solvent. However, the use of a solvent makes it easy to render the medium homogeneous and to develop a uniform reaction. As solvent or hydrocarbon medium one may use solvents such as toluene, benzene, etc. The best results are obtained with toluene. It should be mentioned here that the para-substituted phenols are not soluble in water if the substituent is an aryl or alkyl radical containing more than 4 carbon atoms while they are generally soluble in a hydrocarbon medium, and so are also their condensates with low molecular weights.

As an acid catalyst one may use any Bronstedt or Lewis acid. It is of advantage to employ para-toluene sulfonic acid. However, one could also use the following which are given as indications which are not limiting: phenol sulfonic acids, alkyl phosphoric acids, BF₃ or its complexes, aluminum chloride or its free or complex derivatives as well as the mineral acids, such as sulfuric acid, hydrochloric and phosphoric acids.

The elimination of water during the first stage is an essential element, and the selection of a hydrocarbon medium and of an acid catalyst facilitates it. This elimination can be achieved by carrying-off and reflux, both azeotropic or non-azeotropic, of the water formed.

The temperature at which it is advisable to operate ranges from 70° to 200° C., and in practice, it ranges from 100° to 140° C., depending on the boiling point of the solvent. In the case of toluene, one can operate at a temperature of approximately 110° C. The reaction is left to continue for a period which depends upon the temperature and ranges from 1 hour to 24 hours. At 100° to 110° C. it is about 4 hours.

As has been mentioned, it is advisable to operate with an excess of resorcinal in relation to the active methylene groups introduced, in order to achieve a quantitative reaction making it possible to attain, within a period of about 4 hours, a homogeneous solution of compounds having formulas such as

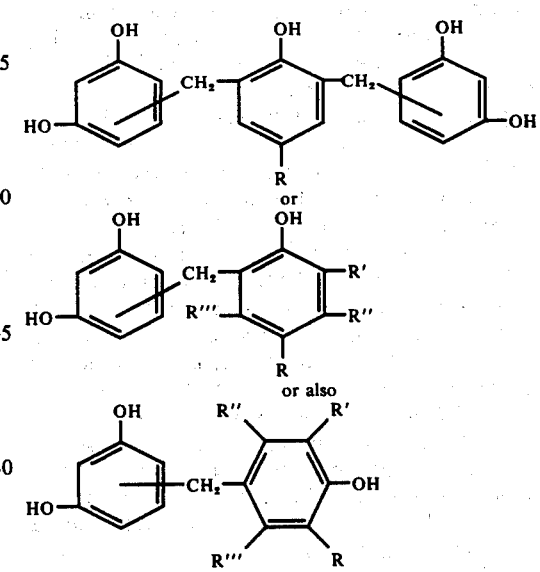

During the second stage, these compounds are dissolved or dispersed in an alcohol, for example, isopropyl alcohol, or any other alcohol, such as ethyl alcohol, allyl alcohol, etc.

The methylolation of the resorcyl nuclei thus substituted is achieved at a temperature ranging from 30° to 40° C., during longer than 30 minutes and preferably during 45 to 60 minutes, by means of formaldehyde, for example, in the form of a commercial aqueous solution containing 30% by weight. The alkalinity of the medium can be assured by means of any suitable base, preferably a soda or potash base. Ammonia or amino compounds which may react with the methylol groups are excluded.

An excess of formaldehyde at the rate of more than one mol but less than two mols per mol of resorcinol used improves the reactivity of the precondensate obtained. A molar ratio of close to 1.25:1 furnishes particularly favorable results. The methylolation of the resorcyl nuclei in the presence of an alcohol results in an improvement of the stability at low temperatures of the precondensate by replacing part of the free methylol groups by alkoxymethylol groups which have a reduced activity at ambient temperature but the same at a high temperature.

The second stage thus facilitates the fixing of the methyl groups or the equivalent methylene groups to the terminal resorcyl rings. The precondensate thereby obtained becomes soluble or dispersible in water, is easily melted at a temperature below 200° C. and reacts in the heat. Its molecular weight which is below 1000 ranges in general from 500 to 800. As stated above, this second stage can be combined with the preparation of a classical formaldehyde-resorcinol precondensate. However, it is preferable to undertake the preparation of the two precondensates separately.

The third stage in the preparation of the adhesive consists in combining the various constituents in aqueous solution, namely, a. the precondensate with methylol resorcyl rings carried by one or more phenol rings substituted in the para position, b. a second resorcinal-formaldehyde precondensate with lower reactivity, c. latices.

The second precondensate is obtained to advantage by having resorcinol and formaldehyde react during longer than 30 minutes, preferably during 45 to 60 minutes, at a temperature ranging from 30° to 40° C. The two precondensates are left to ripen for at least 15 to 30 minutes at approximately 25° C. before combining them. These provisions make is possible to avoid the presence of free formaldehyde which had no time to react, or at least to reduce it to traces.

Due to an excess of resorcinol in relation to the formaldehyde, the second precondensate has a reactivity which has been reduced at will in order to render it close to the reactivity of the first precondensate and in order to promote the subsequent co-condensation of the two precondensates and avoid their separate condensation which would be unfavorable and lead to a reduction in the adhesive strength of the glue or sizing. A proportion of approximately ⅔ mol formaldehyde per mol of resorcinal furnishes generally good results.

As concerns the latexes, one uses by preference a mixture of butadiene-styrene-vinylpyridine terpolymer latexes, of butadiene-styrene copolymer latex or polybutadiene or polyisoprene latex, and finally natural rubber latex. The butadiene-styrene-vinylpyridine terpolymer would constitute to advantage from 50% to 100% of the elastomers present, with a proportion of 60% being preferred, as it offers the advantages of better compatibility of this type of elastomer with the resins without the disadvantage of an excessively high cost price. Half of the other elastomers used could consist of natural rubber latex which offers the advantage of imparting to the adhesive some glue in the raw.

Various favorable precautions or measures can be taken. Thus, it is advisable to free the natural latex from ammonia. It can be stabilized, preferably by means of soda or potash. The ammonia could bring about premature condensation of the phenoplastic precondensates with a tridimensional condition due to amino N-trimethylene bridges during the drying of the glued fiber. On the other hand, it is advantageous if one adds to the precondensates a small quantity of mercaptobenzothiazol, a vulcanization accelerator which will promote covulcanization of the elastomers introduced into the adhesive in the form of latexes, both with one another and with the elastomer to which the fiber is to be attached. Finally, a small quantity of oleic acid or of sodium oleate facilitates the dispersion of the precondensate with hydrophobic substituted phenol rings.

The use of natural rubber latex stabilized with potash or soda, possibly in the presence of a preservative (pentachlorophenol, for example) may be of advantage ad eliminates the deammonification stage. This applies to the 73% dry Revertex Standard extract, stabilized with potash, of the Revertex Co. Ltd.

As regards the proportions of the various constituents of the adhesive, said adhesive comprises approximately 15% to 20% dry extracts consisting of the two precondensates at the ratio of approximately 25 ± 10% and of elastomers (dry extracts of the various elastomers used) at the ratio of approximately 75 ± 10%. In general, one uses substantially equal amounts of the two precondensates, namely, per 100 weight parts of the first precondensate, one preferably uses from 50 to 100 weight parts of the second one, i.e., of the classic type of resorcinol-formaldehyde precondensate.

The method of making the fibers adhesive, especially aromatic polyamide and polyester fibers, in accordance with the invention consists in having the fibers pass through a bath rendering them adhesive which bath consists of the glue or sizing prepared in conformity with the above procedure, in drying the fibers by means of a hot air current, in subjecting the fibers to heat treatment by heating them to a temperature ranging from 210° to 240° C. for a period of 10 to 30 seconds, under a tension of 0.5 to 1.5 kg.

The purpose of introducing the fiber into an adhesive bath is the depositing of a film of glue over its entire surface. The purpose of drying is the elimination of excess water and the initiating of co-condensation of the two phenoplastic precondensates. However, it is advisable to avoid any too extensive development of such condensation. Towards such end, the result becomes better as the temperature at which one operates is lower even though this requires more forceful ventilation over a longer period of time. Under all circumstances, it is preferably not to exceed a temperature of 100° C. or to eliminate more than 95% of the water contained in the adhesive.

The heat treatment has the purpose of facilitating the migration of the substituted phenol rings in the fiber and the production of partial cross-linking of the various resinous elements in the glue or sizing. The fiber thus treated is provided with an adherent film capable of covulcanization with an unsaturated elastomer or polymer. Following vulcanization of the coating elastomer, one obtains in U tensile tests adhesive strengths ranging from 30 to 40 kg. or more per square centimeter of lateral surface of filament assumed to be a cylinder.

The invention is illustrated by the following examples which are offered as specific cases of use of the invention but do not limit same.

EXAMPLE 1 a. In a flask topped by a distillation column provided with an evaporator, a condensing coolant and a separator and in which has been placed 150 cc. toluene one reacts 15 grams Amberol ST 137 resin
30 grams resorcinol
0.2 g. para-toluene sulfonic acid.

The Amberol ST 137 resin is partially condensed p-octyl-O,O′-dimethylol phenol with the average formula

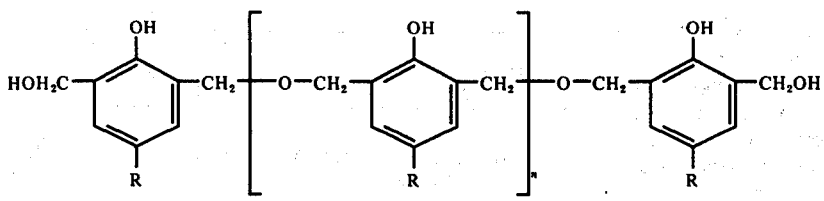

wherein R represents the octyl radical and n is a number which is either 1 or 2 and generally is approximately 1.5.

This resin behaves, under the influence of an acid catalyst, in the same way as para-octyl dimethylol phenol.

The quantity of resorcinol is substantially larger than the quantity corresponding to 2 molecules per phenol nucleus contained in the resin.

The reaction progresses at the boiling point of toluene (approximately 110° C.). The toluene and condensation water vapors are carried off, then condensed by means of a refrigerant and recollected in a container in which the toluene and water are separated by decanting. The reaction is continued until no more water is collected. At that point, the reaction is terminated and the flask then contains, in addition to the free resorcinol and to toluene, a blend of compounds having the formula

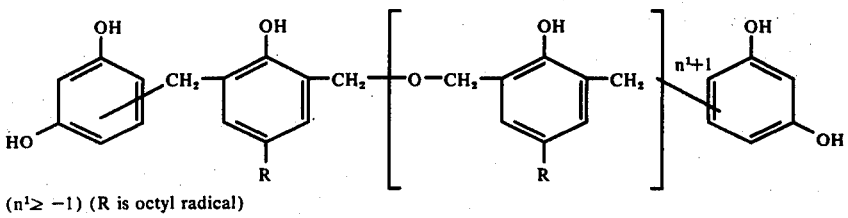

($n^1 \geq -1$) (R is octyl radical)

b. One distills off the toluene and dissolves the phenol derivative carrying terminal resorcyl rings and the excess resorcinol in 45 cc. isopropyl alcohol. To this one adds 45 cc. of a normal aqueous soda solution and 25 cc. of an aqueous solution of 30 weight percent formaldehyde (i.e., approximately 8 grams formaldehye). One condenses for 45 minutes at 30° C.

c. Simultaneously, one causes separate condensation of 30 g. resorcinol in 45 cc. isopropyl alcohol, in the presence of 20 cc. of the same soda solution and 21 cc. of the same formaldehyde solution (i.e., approximately 6 grams formaldehyde), for 45 minutes at a temperature maintained between 35° and 30° C.

d. The two condensates obtained during the operations described in paragraphs (b) and (c) above are mixed after having been subjected to a post-condensation of 15 minutes at 25° C. One adds 1.6 grams oleic acid and 0.78 g mercaptobenzothiazol diluted in 450 cc. water. Furthermore, one also adds the following latexes:

315 cc. of about 65% by weight butadiene- about 20% by weight styrene- about 15% by weight vinylpyridine terpolymer latex known as GEN-TAC and manufactured by The General Tire & Rubber Co., containing 40 weight percent of dry elastomer having a Mooney viscosity (ML 1+4, 100° C.) of ° 70.

150 cc. of a latex mixture containing 30 weight percent dry elastomers, half of them SBR 2108 latex [A cold type about 25% by weight styrene — about 75% by weight butadiene copolymer latex containing 40% by weight of dry elastomer having a Mooney viscosity (ML 1+4, 100° C.) of 120 made by the Firestone Tire & Rubber Co.] and half previously deammoniated natural rubber latex. These latexes are made to constitute a 30% content by the addition of water and, per liter of latex, or 37 cc. of 4% soda.

30 cc. of a hot type polybutadiene latex, type 2004, with 59% by weight dry elastomer [For example, FRS 2004 latex of The Firestone Tire & Rubber Co. — a polybutadiene with about 15% by weight 1,2-vinyl structure, about 30% by weight 1,4-cis structure and about 55% by weight 1,4-trans structure having a Mooney viscosity (ML 1+4, 100° C.) of 70.].

One makes up with water until obtaining 1425 cc. and thus achieves a solution which, in approximately 1150 g. water, contains approximately 275 g. of dissolved dry products, namely, 190 g. elastomers and 80 g. phenol derivatives. This solution constitutes an adhesive which is subjected to tests as follows:

One takes some 1680 × 2 polyester cords of the "Dacron 68" type supplied by E. I. du Pont de Nemours and Co. They are immersed in the adhesive for a few seconds. Subsequently, they are dried for ½ to 1 minute by means of an air current of 100° C. Finally, the cords are treated under 1 kg. tension for 20 seconds, either at a temperature of 217° C. in a ventilated tunnel or at a temperature of 230° C. in a fluidized bed. The cords thus treated are then subjected to the U tensile test. The two ends of a cord loop are imbedded tightly in an elastomer which is vulcanized under pressure (for example, for 20 minutes at 170° C.). Subsequently, one measures the force required to tear off the cord by pulling at the loop, and one relates this force to 1 cm₂ by dividing it by the surface of the cord in contact with the elastomer (assuming that this surface is completely cylindrical) whereby one obtains the force of adhesion.

The measurements undertaken furnished the following results:

| Heat treatment at | 217° C. | 230° C. |
|---|---|---|
| Bonding to polybutadiene | 25 kg. | 30 kg. |
| Bonding to natural rubber | 31 kg. | 32 kg. |

EXAMPLE 2

One reproduces Example 1, except that in the first stage, one uses with 15 g. Amberol ST 137 resin, 2 g. tertiary-butyl para-cresol and 28 g. resorcinol. The tertiary-butyl para-cresol reacts under the action of the catalyst with a fraction of the Amberol ST 137 resin, thereby furnishing a derivative of the monomethylol diphenyl methane type having the formula

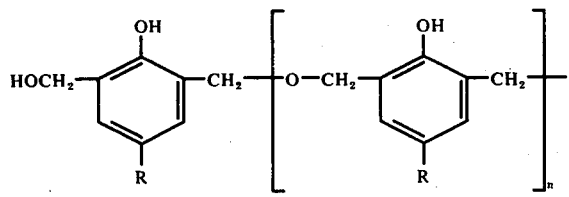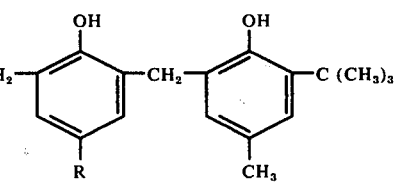

(R = octyl radical; n = 1 or 2, generally about 1.5)

The resorcinol condenses on this compound and on the remaining partially condensed p-octyl-o,o'-dimethylol phenol. Thereafter, the stages described in paragraphs (b), (c), (d), above, progress as in Example 1. The adhesive forces established are:

| Heat treatment at | 217° C. | 230° C. |
|---|---|---|
| Bonding to polybutadiene | 29 kg. | 32 kg. |
| Bonding to natural rubber | 34 kg. | 39 kg. |

Thus, the simultaneous use of mono and dimethylene phenol derivatives offers an appreciable gain in adhesion.

If in place of tertiary-butyl para-cresol one uses tertiary-butyl meta-cresol, the adherences are reduced by 1 to 4 kg.

EXAMPLE 3

One reproduces Example 1, operating in benzene instead of toluene. The reaction is slower.

Following treatment of the fiber at 230° C., the force of adhesion is 28 kg. with polybutadiene and 35 kg. with natural rubber.

EXAMPLE 4

Example 1 is reproduced using, however, in place of a para-octyl phenol condensation resin a p-tertiary-butyl phenol condensation resin. Towards such end, one employs 15 g. Schenectady Chemicals Inc. SP 134 resin in place of the same quantity of Amberol ST 137, while all other conditions remain unchanged. The adhesive strengths obtained are:

| Heat treatment at | 217° C. | 230° C. |
|---|---|---|
| Bonding at polybutadiene | 21 kg. | 28 kg. |
| Bonding at natural rubber | 33 kg. | 41 kg. |

Replacement of the octyl radical by the tertiary-butyl radical as a para-substituent thus leads to similar results.

EXAMPLE 5

One reproduces Example 2 thereby modifying the proportion of formaldehyde. In order to do so, one uses in the stage described in paragraph (c) of Example 1, 12 cc. of soda solution instead of 20 cc., and 18 cc. of formaldehyde solution instead of 21 cc.

The adhesive strengths obtained are:

| Heat treatment at | 217° C. | 230° C. |
|---|---|---|
| Bonding to polybutadiene | 27 kg. | 32 kg. |
| Bonding to natural rubber | 32 kg. | 46 kg. |

The formaldehyde proportion can be varied within rather wide limits.

EXAMPLE 6

One reproduces Example 2 but achieves condensation of the two resins described in paragraphs (b) and (c) of Example 1 during 45 minutes at a temperature of 40° C. instead of 30° C. Furthermore, one prolongs post-condensation (paragraph (d)) at 25° C. for 45 minutes instead of 15 minutes. Thus, one makes certain that there is no longer any free formaldehyde present.

One obtains a considerable improvement in adherence:

| Heat treatment at | 217° C. | 230° C. |
|---|---|---|
| Bonding to polybutadiene | 30 – 31 kg. | 39 – 42 kg. |
| Bonding to natural rubber | 32 – 34 kg. | 42 – 44 kg. |

In contrast thereto, if in place of letting the formaldehyde react in full one delays the addition of part of the formaldehyde, for example 10% of the total quantity, until the moment at which the latexes are added, one finds that the adherence diminishes considerably and then does not exceed 25–27 kg. on butadiene, even if the fiber is treated at 230° C.

EXAMPLE 7

One reproduces Example 6, replacing, however, the Amberol ST 137 resin resulting from a partial condensation of o,o'-dimethylol-p-octyl phenol by an equivalent quantity of o,o'-dimethylol p-methyl phenol.

A considerable reduction in adherence is found:

| Heat treatment at | 217° C. | 230° C. |
|---|---|---|
| Bonding to polybutadiene | 14 kg. | 16 kg. |
| Bonding to natural rubber | 27 kg. | 31 kg. |

When this example is compared with the Examples 1, 2 and 4, it is found that in general it is not of advantage to use for phenols with two active methylene groups a substituent in the para position having a very small number of carbon atoms. It is preferable that the substituent comprise at least 4 carbon atoms and be a tertiary-butyl or octyl radical and not a methyl radical.

EXAMPLE 8

One reproduces Example 6, replacing, however, the tertiary-butyl para-cresol by 2,4- or 2,6-xylenol.

The adherence obtained is as follows:

| Heat treatment at | 217° C. | 230° C. |
|---|---|---|
| Bonding to polybutadiene | 23 – 27 kg. | 34 – 38 kg. |
| Bonding to natural rubber | 27 – 29 kg. | 37 – 40 kg. |

It may be seen that the adhesive strengths are 10% – 15% lower than in Example 6. Thus, among the phenols with two alkyl substituents and a single reactive position, the most advantageous are those in which at least one of the substituents is a radical comprising more carbon atoms than the methyl radical.

EXAMPLE 9

In 150 cc. toluene placed in the equipment described in Example 1, one dissolves 0.1 mol hexanediol (11.8 g.) and 0.2 mol para-chlorophenol (25.7 g.) in the presence of 1 g. para-toluene sulfonic acid. The temperature is raised to the toluene boiling point and one permits the reaction to continue until elimination of the condensation water (3.6 g.). Thereafter, the toluene is distilled and one obtains approximately 33.9 g. of a phenol derivative, i.e., 1,1'-dihydroxy-2,2'-hexamethylene-4,4'-dichlorobisphenyl. This phenol derivative is methylolated by having it react for approximately 48 hours in an aqueous alkaline medium with 0.2 mol formaldehyde (6 g.) at a temperature of approximately 35° C. Thereafter, the acetic acid is precipitated and one obtains 1,1'-dihydroxy-2,2'-hexamethylene-4,4'-dichloro-6,6'-dimethylol bis-phenyl with the formula

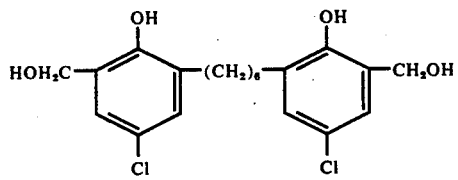

Again one dissolves in the same flask as in Example 1, in which 150 cc. toluene have been placed,
17 g. of the above phenol derivative
2 g. tertiary-butyl para-cresol
28 g. resorcinol
0.2 g. para-toluene sulfonic acid.

Following condensation with elimination of the condensation water, followed by distillation of the toluene, one obtains a phenol derivative with terminal resorcyl nuclei mixed with the free resorcinol, which is dissolved in 45 cc. isopropyl alcohol. One adds 45 cc. of a normal soda solution in water and 25 cc. of a 30 weight percent aqueous formaldehyde solution. The mixture is left to condense during 45 minutes at 40° C.

Furthermore, there are separately condensed 30 g. resorcinol in 45 cc. isopropyl alcohol and 21 cc. of the same formaldehyde solution, in the presence of 20 cc. normal soda solution, this process lasting for 45 minutes at 40° C.

The two condensates obtained are mixed and subjected to post-condensation for 45 minutes at 25° C., in order to reduce the formaldehyde content to traces. Thereafter, one adds 1.6 g. oleic acid and 0.78 g. mercaptobenzothiazol diluted in 450 cc. water. Finally, one adds the same latexes as in Example 1.

In U tensile tests, the adhesive thus prepared furnishes the following results:

| Heat treatment at | 217° C. | 230° C. |
|---|---|---|
| Bonding to polybutadiene | 25 kg. | 33 kg. |
| Bonding to natural rubber | 32 kg. | 42 kg. |

EXAMPLE 10

In the same kind of flask as previously described, containing 150 cc. toluene, one dissolves
7.5 g. ortho-ortho'bis-methylol para-chlorophenol
8 g. dichloro-meta-xylenol
0.2 g. para-toluene sulfonic acid.

The temperature is raised to the boiling temperature of toluene and the reaction is continued until elimination of the condensation water. One obtains, dissolved in toluene, 15 g. 2,2'-dihydroxy-3,5,5'-trichloro-4,6-dimethyl-3'-hydroxymethyl diphenyl methane with the formula

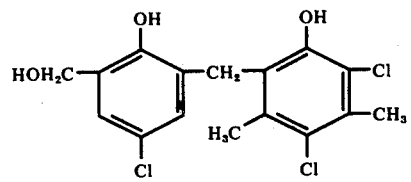

Thereafter, one adds 10 g. resorcinol and continues condensation until total elimination of the condensation water.

As in Example 9, the substance goes into a diluted alcohol medium by dissolving the product obtained in 45 cc. isopropyl alcohol. One adds 45 cc. of normal soda solution, then 25 cc. of 30 weight percent formaldehyde solution. The mixture is left to condense at 40° C. for 45 minutes.

Furthermore, 45 g. resorcinol and 27 cc. of the same formaldehyde solution are condensed for 45 minutes at 40° C.

The two precondensates are then mixed and the preparation of the adhesive is continued exactly as in Example 9.

The adherences obtained by means of the adhesive thus prepared are at least equal to those in Example 9.

EXAMPLE 11

One uses the adhesive of Example 6 with aromatic polyamide fibers. Towards such end, one uses "Nomex" cords of E. I. du Pont de Nemours and Co.

One obtains adhesive strengths of 30 – 35 kg. with polybutadiene after heat treatment of 217° C. and of 35 – 37 kg. after heat treatment at 230° C.

The same fibers adhere very badly with the classic resorcinol-formaldehyde type adhesive.

What is claimed is:

1. A blend of resorcinol-phenolic-formaldehyde precondensate products, the major part of said products having at least on methylolated terminal resorcinol nucleus and having a molecular weight in the general range of from about 500 to about 800 and being soluble or dispersible in water and fusible at a temperature below 200° C.; said blend of resorcinol-phenolic-formaldehyde precondensate products having been prepared by methylolating in an alkaline aqueous alcoholic soda or potash reaction medium at a temperature from about 30° to about 40° C. for from about 30 to about 60 minutes a blend of resorcinol-phenolic condensation products with from about 1 to about 2 mols of formaldehyde per mol of the resorcinol used in preparing said blend of resorcinol-phenolic condensation products; said blend of resorcinol-phenolic condensation products being the condensation products of resorcinol and at least one phenol selected from the group consisting of
1. monocyclic or polycyclic para-substituted phenols having active methylene groups on two terminal ortho positions,
2. monocyclic phenols having one active methylene group on an ortho or para position and at least two substituents, and
3. condensation products of monocyclic phenols having at least two substituents with monocyclic or polycyclic para-substituted phenols having active methylene groups on two terminal ortho positions, the proportion of said monocyclic phenols having one active methylene group and two substituents or of said monocyclic phenols having two substituents being less than 50% of the total amount of phenols; the major part of said resorcinol-phenolic condensation products having at least one terminal resorcinol nucleus attached to a phenol nucleus through one of said active methylene groups, the other terminal nucleus of said resorcinol-phenolic condensation products being a resorcinol nucleus or a phenol nucleus with at least two substituents, and being soluble or dispersible in isopropyl alcohol; said blend of resorcinol-phenolic condensation products having been prepared by condensing in the presence of an acid catalyst at a temperature from about 70° to about 200° C. for from about 1 hour to about 24 hours a stoichiometric excess of resorcinol with said phenol while removing the water of condensation.

* * * * *

UNITED STATES PATENT AND TRADEMARK OFFICE
CERTIFICATE OF CORRECTION

PATENT NO. : 4,035,435
DATED : July 12, 1977
INVENTOR(S) : Georges Rouzier

It is certified that error appears in the above-identified patent and that said Letters Patent are hereby corrected as shown below:

Col. 1, line 53, "temperature" should be -- temperatures --.
Col. 4, line 46, "of a methyl" should be -- or a methyl --.
Col. 6, line 10, "140°C." should be -- 150°C. --; line 17, "resorcinal" should be -- resorcinol --. Col. 7, line 4, "methyl" should be -- methylol --; line 20, "resorcinal-formaldehyde" should be -- resorcinol-formaldehyde --; line 29, "make is" should be -- make it --; line 41, "resorcinal" should be -- resorcinol --. Col. 8, line 5, "ad" should be -- and --. Col. 9, line 65, "°70" should be -- <70 --. Col. 10, line 57, "1 cm₂" should be -- 1 cm² --. Col. 14, line 58, "on methylolated" should be -- one methylolated --.

Signed and Sealed this

Twenty-seventh Day of December 1977

[SEAL]

Attest:

RUTH C. MASON
Attesting Officer

LUTRELLE F. PARKER
Acting Commissioner of Patents and Trademarks